United States Patent
Go

(10) Patent No.: US 11,383,505 B2
(45) Date of Patent: Jul. 12, 2022

(54) BIODEGRADABLE ECO-FRIENDLY MATERIAL AND MANUFACTURING METHOD THERE

(71) Applicant: MAN COLLECTION CO., LTD, Seoul (KR)

(72) Inventor: Eun Yeong Go, Gimpo-si (KR)

(73) Assignee: MAN COLLECTION CO., LTD

( * ) Notice: Subject to any disclaimer, the term of this patent is extended or adjusted under 35 U.S.C. 154(b) by 0 days.

(21) Appl. No.: 17/197,013

(22) Filed: Mar. 9, 2021

(65) Prior Publication Data

US 2021/0276318 A1  Sep. 9, 2021

(51) Int. Cl.
| | |
|---|---|
| *B32B 37/24* | (2006.01) |
| *B32B 5/06* | (2006.01) |
| *B32B 5/02* | (2006.01) |
| *B32B 9/02* | (2006.01) |
| *B32B 9/04* | (2006.01) |
| *B32B 37/06* | (2006.01) |

(Continued)

(52) U.S. Cl.
CPC .............. *B32B 37/24* (2013.01); *B32B 5/024* (2013.01); *B32B 5/073* (2021.05); *B32B 9/025* (2013.01); *B32B 9/047* (2013.01); *B32B 37/06* (2013.01); *B32B 38/06* (2013.01); *B32B 2037/243* (2013.01); *B32B 2038/008* (2013.01); *B32B 2255/02* (2013.01); *B32B 2262/062* (2013.01); *B32B 2262/148* (2021.05); *B32B 2307/4026* (2013.01); *B32B 2307/412* (2013.01); *B32B 2307/724* (2013.01); *B32B 2307/73* (2013.01); *B32B 2317/08* (2013.01); *B32B 2317/10* (2013.01)

(58) Field of Classification Search
CPC .......... B32B 2255/02; B32B 2037/243; B32B 2307/4023; B32B 2307/412; B32B 2307/724; B32B 2307/406; B32B 2307/7163; B32B 2038/008; B32B 37/24; B32B 38/06; B32B 7/12; B32B 2317/08; B32B 37/06; B32B 2255/24; B32B 9/025; B32B 5/024; B32B 2037/1276; B32B 9/047; B32B 2317/10; B32B 2037/148; B32B 3/30; B32B 37/14; B32B 2307/73; B32B 2262/148; B32B 5/073; B32B 2307/4026; B32B 2262/062; D06N 3/0006

See application file for complete search history.

(56) References Cited

U.S. PATENT DOCUMENTS

| | | | |
|---|---|---|---|
| 2018/0371558 A1* | 12/2018 | Kim ................ | B32B 5/245 |
| 2019/0024303 A1* | 1/2019 | Lee ................. | B32B 7/12 |
| 2020/0190731 A1* | 6/2020 | Min ................. | B32B 5/024 |

FOREIGN PATENT DOCUMENTS

KR  20180040463 A  4/2018

* cited by examiner

*Primary Examiner* — Vishal I Patel
(74) *Attorney, Agent, or Firm* — Renaissance IP Law Group LLP

(57) ABSTRACT

Provided are a biodegradable eco-friendly material and a manufacturing method thereof. The biodegradable eco-friendly material includes a biodegradable base fabric into which paper mulberry yarn and cotton yarn are mixed and woven, a leather layer made of a biodegradable material attached to one side of the base fabric, and a coating layer attached to the other side of the base fabric. Here, the base fabric may be woven in a state where 74 to 76 parts by weight of the cotton yarn and 24 to 26 parts by weight of the paper mulberry yarn are mixed.

3 Claims, 4 Drawing Sheets

(51) Int. Cl.
*B32B 38/06* (2006.01)
*B32B 38/00* (2006.01)

BIODEGRADABLE ECO-FRIENDLY MATERIAL AND MANUFACTURING METHOD THERE

BACKGROUND

Technical Field

The present disclosure relates to a biodegradable eco-friendly material including paper mulberry yarn and cotton yarn.

Related Art

In general, PVC or leather (cowhide, snakeskin, fur, etc.) is used as a material used in production of handbags and wallets, and its reinforcing material is formed by chemical fibers.

However, there is a problem in that the above-mentioned materials used in production of the handbags and wallets are not naturally decomposed in a discarded state, which results in environmental pollution.

PRIOR ART LITERATURE (Patent Literature 0001) Korean Unexamined Patent Publication No. 10-2018-0040463

SUMMARY

An object of the present disclosure is to provide a biodegradable eco-friendly material using a base fabric into which paper mulberry yarn and cotton yarn are mixed and woven.

According to an aspect of the present disclosure, there is provided a biodegradable eco-friendly material including a biodegradable base fabric into which paper mulberry yarn and cotton yarn are mixed and woven, a leather layer made of a biodegradable material attached to one side of the base fabric, and a coating layer attached to the other side of the base fabric.

The base fabric may be woven in a state where 74 to 76 parts by weight of the cotton yarn and 24 to 26 parts by weight of the paper mulberry yarn are mixed.

The base fabric may be woven in a state where 75 parts by weight of the cotton yarn and 25 parts by weight of the paper mulberry yarn are mixed, and may be a fabric in a state where the paper mulberry yarn or the cotton yarn are colored.

The base fabric and the leather layer may be attached to each other by an adhesive, and the adhesive may be a water-based adhesive.

The leather layer may be formed by a step of crushing cowhide and compressing and bonding the crushed cowhide to be attached to the other side of the base fabric.

The coating layer may include an animal protein component, and may be coated on the surface of the base fabric by spraying, so that the surface of the base fabric may be transparently water-repelled.

According to another aspect of the present disclosure, there is provided a method including: (a) a step of weaving a base fabric including 74 to 76 parts by weight of cotton yarn, and 24 to 26 parts by weight of paper mulberry yarn; (b) a step of forming a coating layer that is a transparent water-repellent coating layer on the base fabric provided in the step (a); (c) a step of attaching a leather layer made of a biodegradable material to one side surface of the base fabric provided in the step (a).

The method may further include: (d) a step of aging the base fabric to which the leather layer is attached in the step (c); (e) a step of performing embossing on a surface of the aged base fabric provided in the step (d); (f) a step of performing an aqueous binder process onto the embossed surface provided in the step (e); (g) a step of performing thermal compression bonding between the base fabric and the leather layer after the step (f), and (h) a step of performing a surface dyeing process and a glossing process after the step (g).

According to the embodiments of the present disclosure, it is possible to provide a base fabric of a biodegradable eco-friendly material into which paper mulberry yarn and cotton yarn are mixed and woven, in which the paper mulberry yarn is included in a range of 24 to 26 parts by weight and the cotton yarn is included in a range of 74 to 76 parts by weight. Thus, it is possible to naturally decompose the base fabric within a period less than 5 years in a discarded state, and thus, it is possible to effectively prevent the occurrence of environmental pollution.

DETAILED DESCRIPTION

Figure 1:
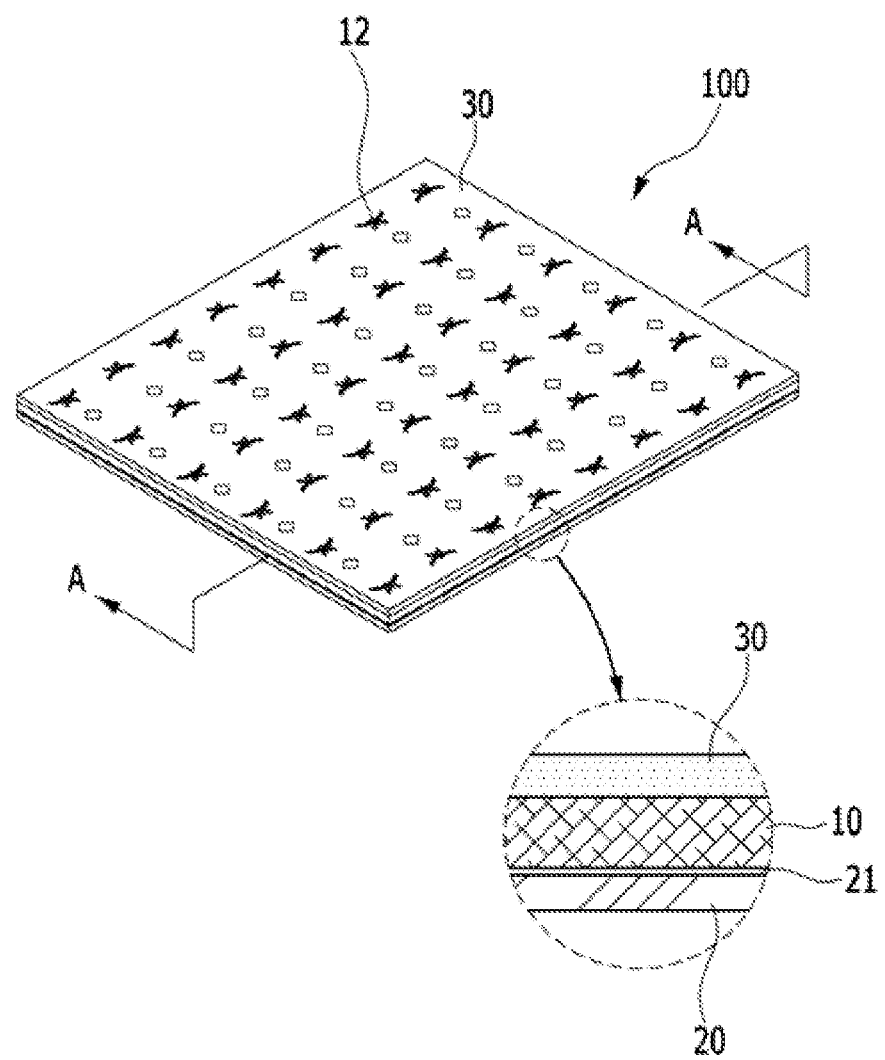
FIG. 1 is a perspective view schematically showing a biodegradable eco-friendly material according to an embodiment of the present disclosure.

Hereinafter, embodiments of the present disclosure will be described in detail with reference to the accompanying drawings so that those of ordinary skill in the art can easily implement the present disclosure. However, the present disclosure is not limited to the embodiments described herein, and may be implemented in various different forms. In the drawings, parts irrelevant to the description are omitted in order to clearly describe the present disclosure, and the same reference numerals are attached to the same or similar components throughout the specification.

Figure 2:
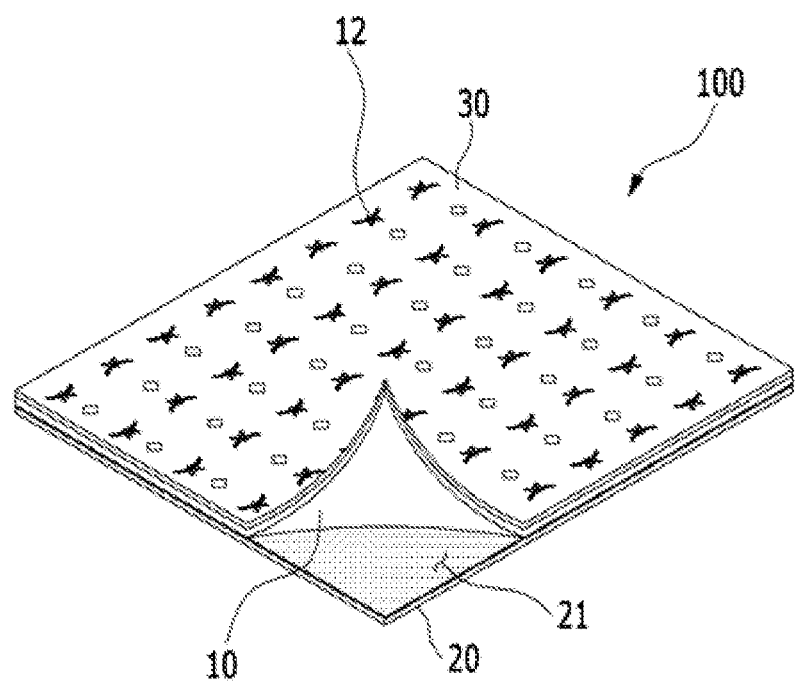
FIG. 2 is a perspective view schematically showing a state in which a part of an edge of the biodegradable eco-friendly material in FIG. 1 is separated.
Figure 3:
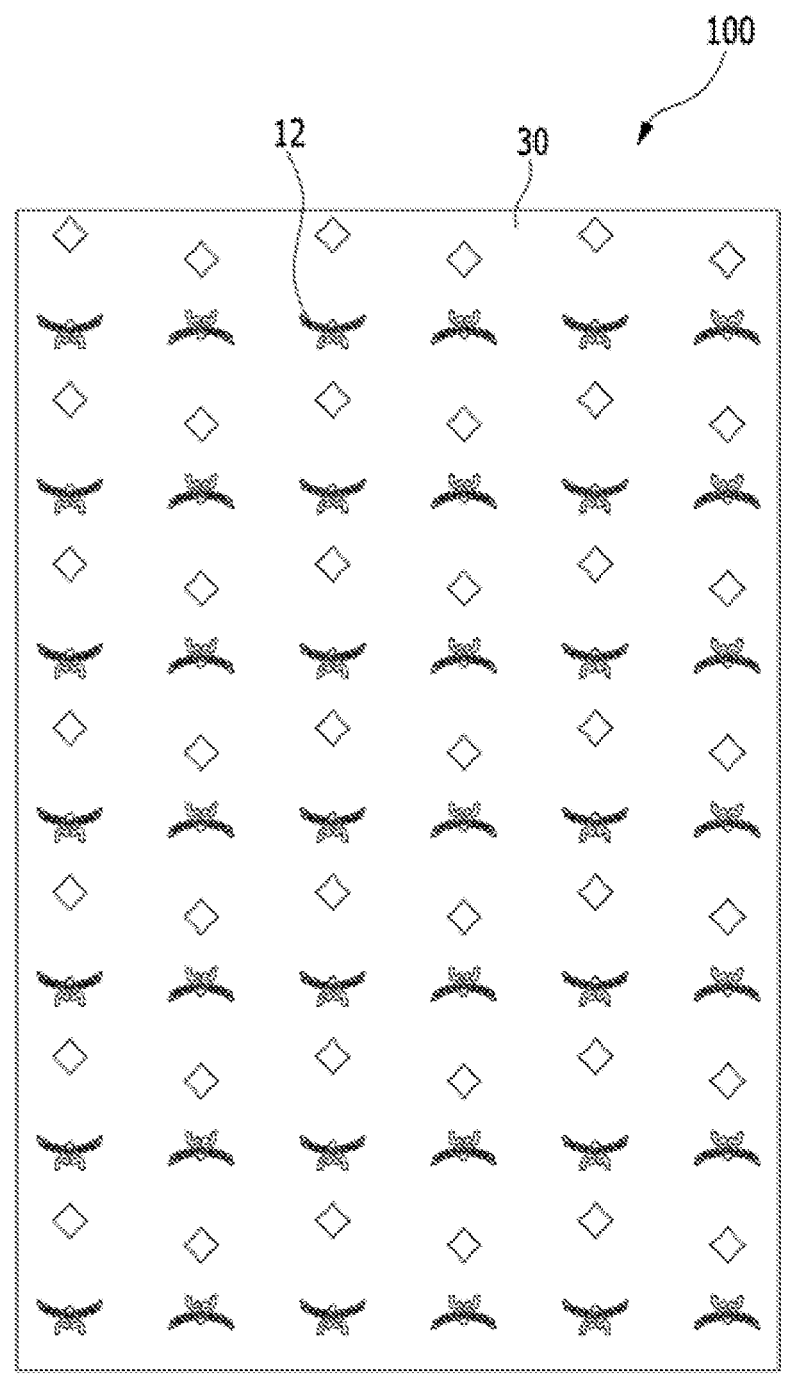
FIG. 3 is a plan view schematically showing the biodegradable eco-friendly material according to the embodiment of the present disclosure.
Figure 4:
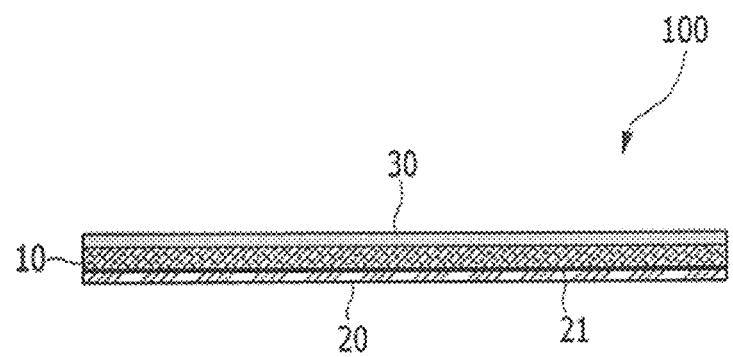
FIG. 4 is a cross-sectional view taken along line A-A in FIG. 1.

FIG. 1 is a perspective view schematically showing a biodegradable eco-friendly material according to an embodiment of the present disclosure, FIG. 2 is a perspective view schematically showing a state in which a part of an edge of the biodegradable eco-friendly material in FIG. 1 is separated, FIG. 3 is a plan view schematically showing the biodegradable eco-friendly material according to the embodiment of the present disclosure, and FIG. 4 is a cross-sectional view taken along line A-A in FIG. 1.

As shown in FIGS. 1 to 4, a biodegradable eco-friendly material 100 according to a first embodiment of the present disclosure includes a base fabric 10 into which paper mulberry yarn and cotton yarn are mixed and woven, a leather layer 20 made of a biodegradable material attached to one side of the base fabric 10, and a coating layer 30 attached to the other side of the base fabric 10. The base fabric 10 includes 74 to 76 parts by weight of the cotton yarn, and 24 to 26 parts by weight of the paper mulberry yarn. The base fabric 10 is formed of a biodegradable material, and may be formed of a material capable of being naturally decomposed within a maximum of 5 years in a discarded state.

The base fabric 10 may be woven in a state where the paper mulberry yarn and the cotton yarn are mixed in this embodiment.

The paper mulberry (or *Broussonetia kazinoki*) is a material used in manufacturing traditional Korean paper. The paper mulberry is also called *Viburnum sargentii* or the like, and is used as a very important material in manufacturing Korean paper, and is gaining attention as an important raw material for window paper, copy paper, or the like.

In this embodiment, the paper mulberry yarn is formed of a fibrous component such as yarn to form a part of the base fabric 10, and may be provided in a range of 24 to 26 parts by weight in 100 parts by weight of the base fabric 10.

More specifically, the paper mulberry yarn may be included in an amount of 25 parts by weight in 100 parts by weight of the base fabric 10. The above-mentioned paper mulberry yarn is woven in a state of being mixed with the cotton yarn to form the base fabric 10.

In this way, in a case where the paper mulberry yarn is included in the amount of 25 parts by weight in 100 parts by weight of the base fabric 10 and is woven to form the base fabric 10, it is preferable that the base fabric 10 is formed of a biodegradable material capable of being naturally decomposed.

Accordingly, since the base fabric 10 is formed of the paper mulberry yarn of the biodegradable material, it is possible to easily naturally decompose the base fabric within a period less than 5 years in a discarded state, to thereby prevent environmental pollution and improve user satisfaction.

On the other hand, the cotton yarn is provided in a range of 74 to 76 parts by weight in 100 parts by weight of the base fabric 10, and is woven in a state of being mixed with the paper mulberry yarn to form the base fabric 10.

More specifically, the cotton yarn may be included in an amount of 75 parts by weight in 100 parts by weight of the base fabric 10. The cotton yarn may be woven in a state of being mixed with the paper mulberry yarn to form the base fabric 10.

In this way, in a case where the cotton yarn is included in the amount of 75 parts by weight in 100 parts by weight of the base fabric 10 and is woven to form the base fabric 10, it is preferable that the base fabric 10 is formed of a biodegradable material capable of being naturally decomposed.

Accordingly, since the base fabric 10 includes the cotton yarn of the biodegradable material, it is possible to easily naturally decompose the base fabric 10 within a period less than 5 years in a discarded state, to thereby prevent environmental pollution and improve user satisfaction.

That is, since the cotton yarn that forms the base fabric 10 can be naturally decomposed in a period less than 5 years in a discarded state and the paper mulberry yarn can be naturally decomposed in a period less than 5 years in a discarded state, it is possible to effectively prevent environment pollution.

The base fabric 10 may be a fabric that is woven in a state where the paper mulberry yarn or the cotton yarn is colored.

That is, the base fabric 10 may be woven in a state where a part or the entirety of the paper mulberry yarn or the cotton yarn is colored. Accordingly, the base fabric 10 may have a pattern 21 formed on the surface of the base fabric 10 at the same time as the weaving is completed.

Meanwhile, the leather layer 20 made of a biodegradable material may be attached to one side of the base fabric 10.

The leather layer 20 is attached to cover the entirety of one side of the base fabric 10, is formed of a material capable of being naturally decomposed in a discarded state, and is attached to one side of the base fabric 10.

The leather layer 20 is formed by bonding the crushed cowhide to one side of the base fabric 10. The leather layer may be manufactured in a state where the cowhide material is crushed and mixed in a mash type, and then, may be bonded to the one side of the base fabric 10.

Namely, the leather layer 20 may be formed by a step of crushing cowhide and a step of compressing and bonding the crushed cowhide to be attached to one side of the base fabric.

In this way, the leather layer 20 is attached to one side of the base fabric 10 to provide a supporting force of the shape of the base fabric 10 to improve durability.

The leather layer 20 may be attached to one side of the base fabric 10 as a single layer, or as a plurality of layers.

The leather layer 20 may be firmly attached to one side of the base fabric 10 by a water-based adhesive 21.

The water-based adhesive 21 is applied onto the entire facing surfaces of the base fabric 10 and the leather layer 20, so that the base fabric 10 and the leather layer 20 can be firmly adhered to each other.

On the other hand, the coating layer 30 may be formed on the other side of the base fabric 10.

The coating layer 30 is formed on a surface of the base fabric 10 opposite to the surface thereof on which the leather layer 20 is attached so that the base fabric 10 is interposed therebetween, and may be applied onto the surface of the base fabric 10 by spraying.

This coating layer 30 may include an animal protein component to be applied onto the surface of the base fabric 10 by spraying.

The coating layer 30 may be applied onto the entire surface of the base fabric 10 by spraying or the like so that the surface of the base fabric 10 is coated with a water repellent. The coating layer 30 may be formed by a transparent material so that the surface of the base fabric 10 can be visually confirmed, and thus, it is possible to effectively prevent contamination damage due to contact with water.

In this way, since the coating layer 30 is formed by an animal protein component, it is possible to naturally decompose the coating layer 30, to thereby prevent environmental pollution.

As described above, the biodegradable eco-friendly material 100 of the present embodiment forms the base fabric 10 by mixing and weaving paper mulberry yarn and cotton yarn, in which the base fabric 10 is woven in a state where the mulberry yarn of the amount of 24 to 26 parts by weight and the cotton yarn of the amount of 74 to 76 parts by weight are mixed, and may be manufactured as a biodegradable eco-friendly material. Accordingly, it is possible to naturally decompose the material within a period less than 5 years in a discarded state, and thus, it is possible to effectively prevent the occurrence of environmental pollution.

Figure 5:
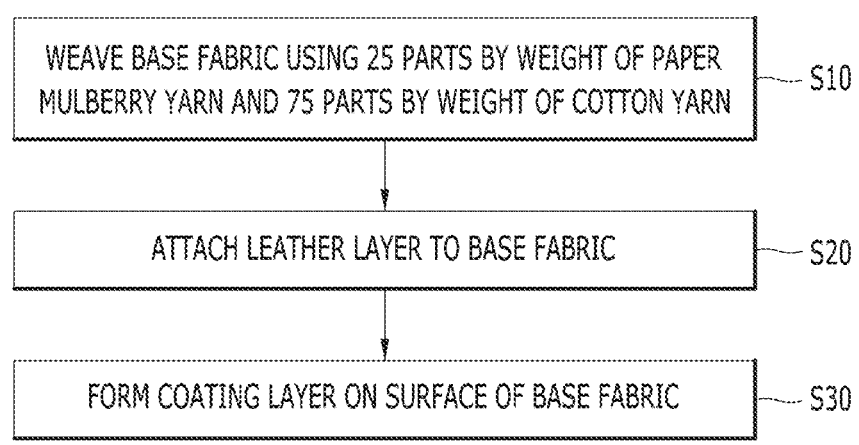
FIG. 5 is a flowchart schematically illustrating a method for manufacturing a biodegradable eco-friendly material according to an embodiment of the present disclosure.

FIG. 5 is a flowchart schematically illustrating a method for manufacturing a biodegradable eco-friendly material according to an embodiment of the present disclosure. The same reference numerals as in FIGS. 1 to 4 represent the same or similar components having the same or similar functions, and detailed description thereof will not be repeated. Hereinafter, the method for manufacturing the eco-friendly material according to the embodiment of the present disclosure will be described in detail.

First, the base fabric 10 is woven in a state of including 24 to 26 parts by weight of the paper mulberry yarn and 74 to 76 parts by weight of the cotton yarn (S10).

More preferably, in the step S10, the base fabric 10 may be woven in a state of including 25 parts by weight of the paper mulberry yarn and 75 parts by weight of the cotton yarn.

The base fabric 10 may be a fabric that is woven in a state where the paper mulberry yarn or the cotton yarn is colored.

Here, the base fabric 10 may be woven in a state where a part or the entirety of the paper mulberry yarn or the cotton yarn is colored. Accordingly, the base fabric 10 may have a pattern formed on the surface of the base fabric 10 at the same time as the weaving is completed.

Then, the leather layer 20 is attached to one side of the base fabric provided in step S10 (S20).

In step S20, the leather layer 20 may be made of a biodegradable material, and may be manufactured in a state where a cowhide material is crushed and mixed in a mash type, and then, may be bonded to the side of the base fabric 10.

In step S20, the leather layer 20 may be formed by a step of crushing the cowhide and a step of compressing and bonding the crushed cowhide, and then, may be attached to the side of the base fabric 10. The bonding of the leather layer 20 in step S20 may be firmly attached to the side of the base fabric 10 by a water-based adhesive 21.

Then, the transparent water-repellent coating layer 30 is formed on the other side of the base fabric 10 provided in step S10 (S30).

In step S30, the coating layer 30 may include an animal protein component to be applied onto the surface of the base fabric 10 by spraying or the like, and the surface of the base fabric 10 may be coated with a transparent water repellent.

In step S30, the coating layer 30 may be applied onto the entire surface of the base fabric 10 by spraying or the like so that the surface of the base fabric 10 can be coated with a water repellent. In this way, in a case where the coating layer 30 is coated with the transparent material, it is possible to visually confirm the surface of the base fabric 10, and thus, it is possible to effectively prevent contamination damage due to contact with water.

Then, the base fabric 10 to which the leather layer 20 is attached is aged (S40).

Through the aging process of the base fabric 10 to which the leather layer 20 is attached in step S40, it is possible to achieve strong bonding of the leather layer 20 and the base fabric 10.

Through step S40, it is possible to effectively reinforce a low tensile strength of the Korean paper of the base fabric 10 to form a tough material, and to block moisture that may penetrate into the base fabric 10 to improve durability.

Then, an embossing process is performed on the surface of the base fabric 10 aged in step S40 (S50). Through the surface embossing process in step S50, it is possible to realize a beautiful appearance, thereby improving productivity.

Then, an aqueous binder process is performed on the embossed surface provided in step S50 (S60).

Through the aqueous binder process in step S60, it is possible to form a coating film on the surface, thereby achieving reinforcement of the strength.

Then, the base fabric 10 and the leather layer 20 are subjected to thermal compression bonding (S70). Through the thermal compression bonding in step S70, it is possible to achieve a strong compressed bonding state.

Then, a surface dyeing process and a glossing process are performed (S80).

In step S80, it is possible to give an appropriate color the surface through the dyeing process, and to improve the productivity through the glossing process.

Although the preferred embodiments of the present disclosure have been described above, the present disclosure is not limited thereto. Various modifications can be made within the scope of claims, the detailed description of the invention, and the accompanying drawings, which fall within the scope of the present disclosure.

EXPLANATION OF REFERENCES

10: base fabric
12: pattern
20: leather layer
21: water-based adhesive
30: coating layer

What is claimed is:

1. A method for manufacturing a biodegradable eco-friendly material including a biodegradable base fabric 10 into which paper mulberry yarn and cotton yarn are mixed and woven, a leather layer 20 made of a biodegradable material attached to one side of the base fabric 10, and a coating layer 30 attached to the other side of the base fabric 10, the method comprising:
   (a) a step of weaving the base fabric 10 including 74 to 76 parts by weight of the cotton yarn, and 24 to 26 parts by weight of the paper mulberry yarn;
   (b) a step of forming the coating layer 30 that is a transparent water-repellent coating layer on the base fabric 10 provided in the step (a);
   (c) a step of attaching the leather layer 20 made of the biodegradable material to the one side surface of the base fabric 10 provided in the step (a);
   (d) a step of aging the base fabric 10 to which the leather layer 20 is attached, provided in the step (c);
   (e) a step of performing embossing on a surface of the aged base fabric 10 provided in the step (d);
   (f) a step of performing an aqueous binder process onto the embossed surface provided in the step (e); and
   (g) a step of performing thermal compression bonding between the base fabric 10 and the leather layer 20 after the step (f),
   wherein the base fabric 10 and the leather layer 20 are attached to each other by a water-based adhesive,
   wherein the leather layer 20 is formed by a step of crushing cowhide and compressing and bonding the crushed cowhide to be attached to the other side of the base fabric 10, and
   wherein the coating layer 30 includes an animal protein component.

2. The method for manufacturing the biodegradable eco-friendly material according to claim 1, further comprising:
   (h) a step of performing a surface dyeing process and a glossing process after the step (g).

3. The method for manufacturing the biodegradable eco-friendly material according to claim 1,
   wherein in the step (a) of weaving the base fabric 10 including the 74 to 76 parts by weight of the cotton yarn and 24 to 26 parts by weight of the paper mulberry yarn, the base fabric 10 is weaved in a state where a part of the paper mulberry yarn or the cotton yarn is coated with a color and a pattern 21 is formed on the surface of the base fabric 10 at the same time as the weaving is completed.

\* \* \* \* \*